US009841499B2

United States Patent
Ding

(10) Patent No.: US 9,841,499 B2
(45) Date of Patent: Dec. 12, 2017

(54) INTRUSION DETECTOR AND METHOD FOR IMPROVED SENSITIVITY

(71) Applicant: Honeywell International Inc., Morristown, NJ (US)

(72) Inventor: David Ding, Shenzhen (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 547 days.

(21) Appl. No.: 14/510,394

(22) Filed: Oct. 9, 2014

(65) Prior Publication Data
US 2016/0154096 A1     Jun. 2, 2016

(51) Int. Cl.
| | | |
|---|---|---|
| G08B 29/28 | (2006.01) | |
| G01S 7/28 | (2006.01) | |
| G01S 13/04 | (2006.01) | |
| G01S 13/56 | (2006.01) | |
| G08B 13/24 | (2006.01) | |
| G08B 29/18 | (2006.01) | |
| G01S 7/285 | (2006.01) | |

(52) U.S. Cl.
CPC .............. *G01S 13/04* (2013.01); *G01S 7/285* (2013.01); *G01S 13/56* (2013.01); *G08B 13/2491* (2013.01); *G08B 29/185* (2013.01); *G01S 7/28* (2013.01)

(58) Field of Classification Search
CPC . G01S 13/56; G01S 13/04; G01S 7/28; G01S 7/285; G08B 13/2491; G08B 29/185
USPC .......................................................... 342/28
See application file for complete search history.

(56) References Cited

U.S. PATENT DOCUMENTS

| | | | | |
|---|---|---|---|---|
| 3,432,855 A | * | 3/1969 | Kalmus ................. | G01S 13/583 342/114 |
| 3,942,178 A | * | 3/1976 | Hackett ................... | G01S 13/56 340/552 |
| 4,053,887 A | * | 10/1977 | Holford ................ | G01S 7/2922 342/114 |
| 4,083,049 A | * | 4/1978 | Mattern .............. | G01S 13/5265 342/159 |
| 4,225,858 A | * | 9/1980 | Cole ....................... | G01S 13/56 340/554 |
| 4,697,184 A | * | 9/1987 | Cheal ..................... | G01S 13/56 340/554 |

(Continued)

FOREIGN PATENT DOCUMENTS

| | | |
|---|---|---|
| CN | 103684464 A | 3/2014 |
| EP | 1 826 732 A2 | 8/2007 |

(Continued)

OTHER PUBLICATIONS

English-language translation of Chinese patent publication CN 103684464 A, dated Mar. 26, 2014.

(Continued)

*Primary Examiner* — Peter M Bythrow
(74) *Attorney, Agent, or Firm* — Husch Blackwell LLP

(57) ABSTRACT

A motion detector includes a microwave-based module to detect movement. Intermediate processing circuitry is coupled to an output from the module. The processing circuitry is activated intermittently to produce first and second pulsed output signals. Cross-correlation circuitry processes the two signals to produce a motion indicating output signal.

15 Claims, 3 Drawing Sheets

(56) References Cited

U.S. PATENT DOCUMENTS

| | | | | |
|---|---|---|---|---|
| 6,031,482 | A * | 2/2000 | Lemaitre | G01S 7/415 342/22 |
| 6,380,882 | B1 * | 4/2002 | Hegnauer | G01S 13/348 340/554 |
| 6,677,887 | B2 * | 1/2004 | Harman | G01S 13/56 342/107 |
| 6,842,113 | B2 * | 1/2005 | Tsuji | G08B 13/2491 340/552 |
| 6,992,577 | B2 * | 1/2006 | Tsuji | G01S 13/56 340/522 |
| 7,167,008 | B2 * | 1/2007 | Tsuji | G01S 7/354 324/644 |
| 8,013,309 | B2 * | 9/2011 | Tsuji | G01N 22/00 250/336.1 |
| 2002/0130807 | A1 * | 9/2002 | Hall | G01S 7/282 342/28 |
| 2004/0222887 | A1 * | 11/2004 | Tsuji | G01S 13/52 340/552 |
| 2007/0216529 | A1 * | 9/2007 | Hobden | G01S 13/56 340/552 |
| 2009/0051529 | A1 * | 2/2009 | Tsuji | G01S 13/38 340/554 |
| 2012/0274502 | A1 * | 11/2012 | Hyde | G01S 7/412 342/175 |

FOREIGN PATENT DOCUMENTS

| | | |
|---|---|---|
| GB | 2 081 545 A | 2/1982 |
| GB | 2 401 500 A | 11/2004 |

OTHER PUBLICATIONS

Extended European Search Report from corresponding EP patent application 15188431.9, dated Mar. 8, 2016.

Examination report from corresponding EP patent application 15188431.9, dated Jul. 13, 2017.

* cited by examiner

INTRUSION DETECTOR AND METHOD FOR IMPROVED SENSITIVITY

FIELD

The application pertains to intrusion detectors used in monitoring regions of interest. More particularly, the application pertains to such detectors and associated methods that provide improved signal-to-noise ratios and enlarge a detection area in a region of interest without increased power consumption.

BACKGROUND

Motion detectors incorporating microwave technology are widely used in the field of security. There are two modules in this type of detector. One is a microwave detection module that radiates microwaves into a monitored area of space and receives reflected waves. If there are moving objects, then the frequency of the reflected microwave is different from the radiated microwave. By mixing the received and radiated microwaves, we can get the difference frequency (also called intermediate frequency, IF). The other module is an IF signal processing module that will amplify, digitize, and extract an IF signal.

If there is a person walking in the monitored area, then the detection module detects the frequency difference between transmitted and received microwaves and outputs the corresponding IF frequency. The IF signals are amplified, sampled, and processed by hardware circuit and algorithms of the IF processing module to determine whether there has been an intrusion. A corresponding control output can then be generated.

Typically, a prior art motion detector using microwave technology, illustrated in FIG. 1, includes the microwave detection module 110 and the IF signal processing module 120. As illustrated in the diagram of FIG. 1, the detection module 110 outputs an electrical IF signal by sensing the motion of a human body. Then, the IF signal is processed by the IF module 120. That signal is then identified by processing in a Digital Signal Processor (DSP). A corresponding control output signal can then be generated.

The circuit of FIG. 1 exhibits several problems. The IF processing module 120 adds noise to the IF signal output by the microwave detection module 110. Hence, it is very easy to miss alarms for weak signals, such as those signals generated by long range targets or having a low scattering cross section area. Additionally, if the detection module is battery-powered, then the radiated microwave power can only have limited signal strength. Therefore, detector sensitivity is a problem at times.

DETAILED DESCRIPTION

Figure 1:
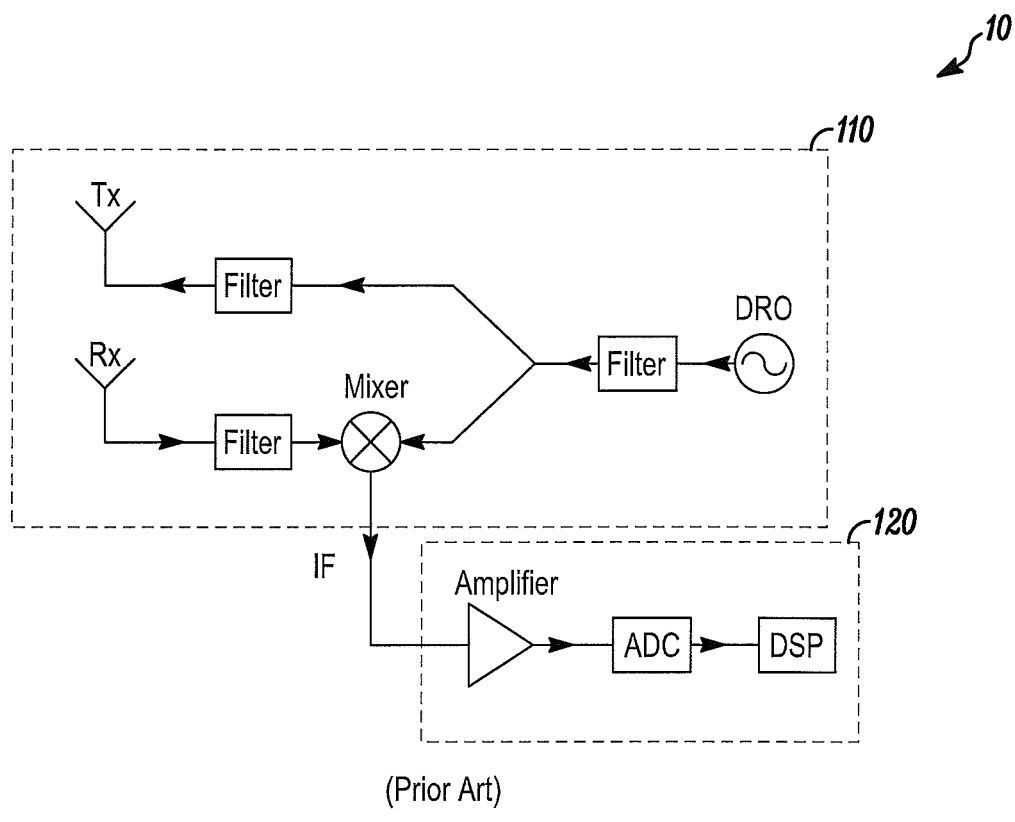
FIG. 1 is a block diagram of a prior art system.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

In one aspect, embodiments hereof relate to surveillance systems for detecting an intruder in a monitored area of space. More particularly, embodiments disclose improvements for a signal processing method for intrusion sensors. More specifically, a method for intermediate signal amplifying processing is disclosed. Advantageously, this method can effectively improve the signal-to-noise ratio of microwave-type detection systems and enlarge a detection area without increasing the power consumption for a microwave unit.

Disclosed embodiments incorporate cross-correlation methods to process an IF signal from a microwave-type intrusion sensor. This processing will produce motion indicating signals with substantially reduced noise compared to that generated by the sensor and subsequent amplifiers of an IF processing module.

In another aspect, the IF signal generated by the microwave intrusion sensor is spit at a node into two signals. The two signals are separately and identically processed. Each of the signals is amplified and then sampled. This produces two digital time sequences, S1(n) and S2(n). Cross-correlation processing of the signals can be carried out using a digital signal processor (DSP).

Figure 2:
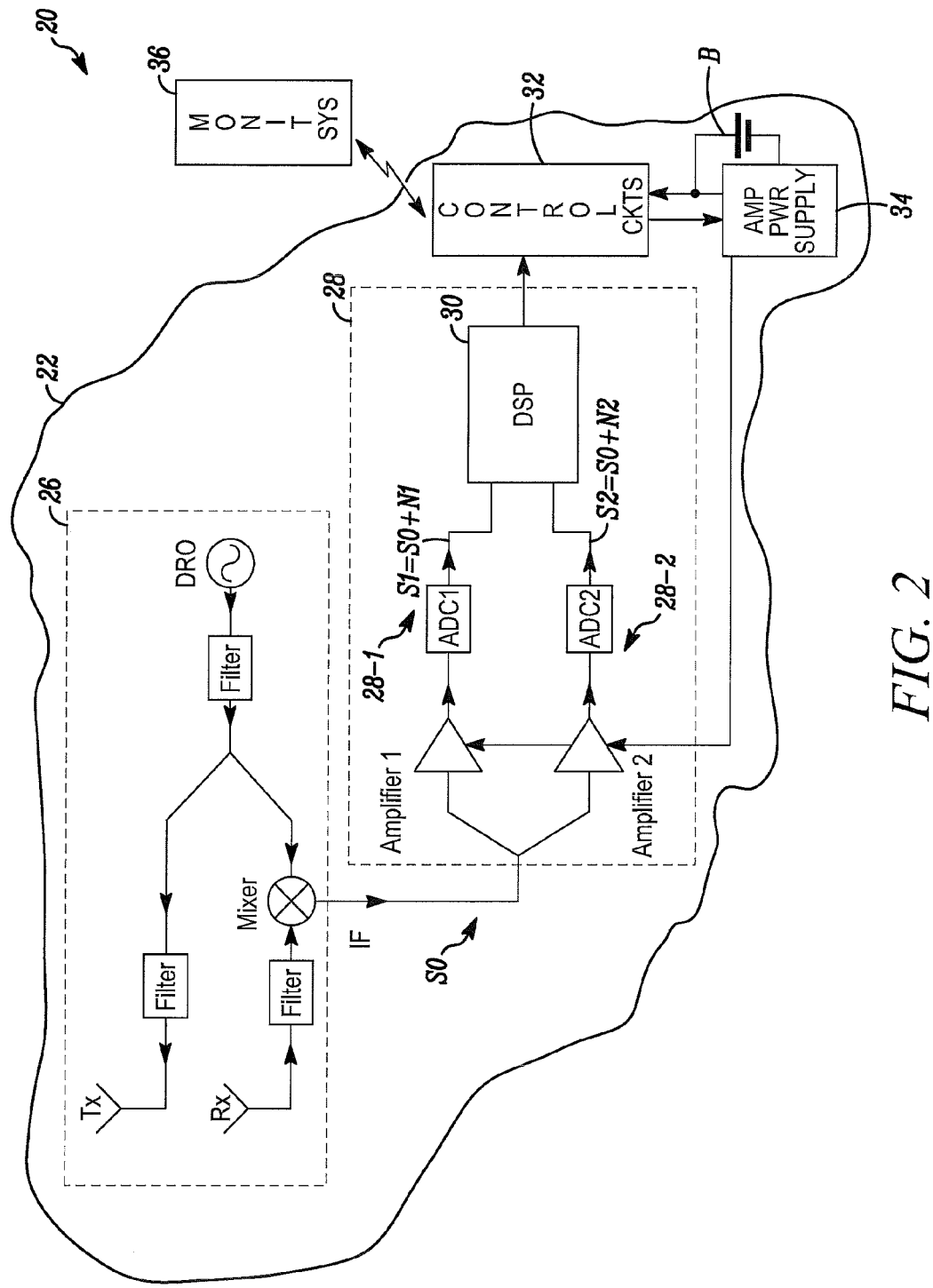
FIG. 2 is a block diagram of an embodiment hereof.

FIG. 2 illustrates a detector 20 in accordance herewith. The detector 20 is carried in a housing 22. The detector 20 includes a microwave-type intrusion sensor module 26 that generates an output IF signal, labeled S0 in FIG. 2.

The signal S0 is, in turn, coupled to an IF processing module 28. The module 28 includes first and second substantially identical amplifier/analog-to-digital converter strings 28-1, 28-2. It will be understood that the use of two strings is exemplary only. Three or more strings could be used without departing from the spirit and scope hereof.

The two strings 28-1, 28-2 are coupled to a DSP 30. Outputs from the DSP 30 can be coupled to control circuits 32. It will be understood that the DSP 30 could be incorporated into and made a part of the control circuits 32 without departing from the spirit and scope hereof.

The control circuits 32 can be implemented with hard-wired circuits along with one or more programmed processors and associated control software. The DSP 30 can be implemented, if desired, as a hardwired unit.

The control circuits 32 are coupled to an amplifier power supply 34 that can be energized by a battery B that also energizes other circuits of the detector 20. The control circuits 32 can be in wired or wireless communication with a displaced monitoring system 36. The detector 20 can be one of a plurality of such detectors that communicate with the monitoring system 36.

There are at least two approaches to improve the sensitivity of microwave-type motion detectors. One way is to place a low noise amplifier (LNA) between a receiving antenna and mixer of the sensing module, such as the module 26. Another way is to reduce the noise that will be added to the signal by subsequent processing circuits. Because the receiver antenna Rx is very close to a transmitter antenna Tx, their coupling is very strong. Hence, if a LNA is placed after the receiver antenna Rx, then the LNA may be saturated. Therefore, the practical way to improve sensitivity is to reduce signal noise.

Sources of signal noise include circuit components as well as the way in which various modules or components are operated. Surprisingly, despite the fact that the detector 20 incorporates two signal paths 28-1, 28-2, overall noise effects can be reduced in the embodiment 20. As illustrated in FIG. 2, N1 and N2 designate the noise generated by the first and second paths, respectively. Due to the independence of the two paths, the two noise components are independent and stochastic. As a result of using cross-correlation processing, the two noise components N1, N2 can be cancelled out.

In further explanation, if S1 and S2 are the output of the first and second paths, respectively, then their cross correlation function is:

$$R_{S_1S_2}(\tau) = \lim_{T\to\infty} \frac{1}{T} \int_0^T S_1(t)S_2(t-\tau)\,dt =$$

$$\lim_{T\to\infty} \frac{1}{T} \int_0^T [S_0(t) + N_1(t)][S_0(t-\tau) + N_2(t-\tau)]\,dt =$$

$$\lim_{T\to\infty} \frac{1}{T} \int_0^T [S_0(t)S_0(t-\tau) + S_0(t)N_2(t-\tau) +$$

$$N_1(t)S_0(t-\tau) + N_1(t)N_2(t-\tau)]\,dt =$$

$$R_{S_DS_D}(\tau) + R_{S_DN_2}(\tau) + R_{N_1S_D}(\tau) + R_{N_1N_2}(\tau)$$

When N1 and N2 are zero-mean white Gaussian noises, in signal S0, N1 and N2 are uncorrelated with each other so $R_{S_DN_2}(\tau)$, $R_{N_1N_D}(\tau)$ and $R_{N_1N_2}(\tau)$ are equal to zero.

In summary, in addition to reducing noise generated by the circuit components 28-1, 28-2, by applying the cross-correlation method to process the IF signal as discussed above, the disclosed detectors will have an improved detecting sensitivity that makes a sensor detection range/area larger. Further, by applying the cross-correlation to process IF signals for a given detection range/area, such detectors can be expected to have fewer false alarms. As a result of applying the cross-correlation method to process IF signals for a given detection range/area, the detector needs less radiated power and less power dissipation.

Figure 3:
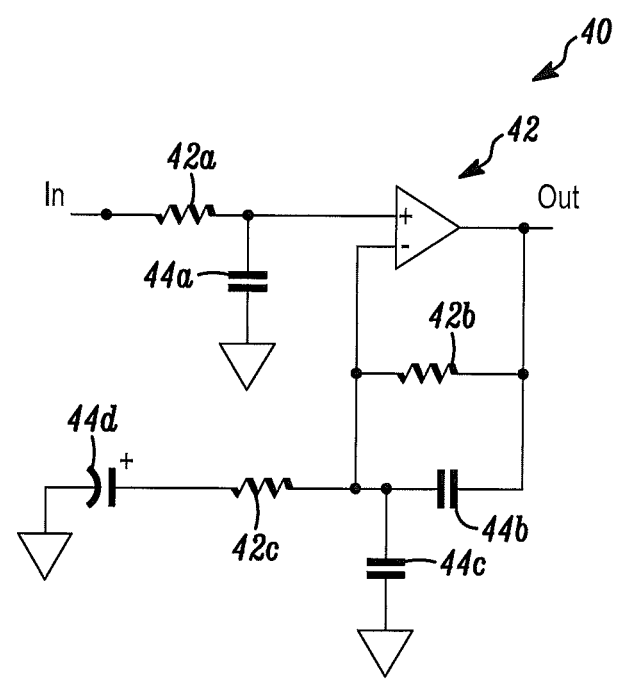
FIG. 3 is a schematic of an exemplary amplifier circuit.

FIG. 3 illustrates an exemplary amplifier circuit 40 usable in the detector 20. The amplifier 40 includes an operational amplifier 42, for example, an LM324A, as well as a combination of resistors 42a, 42b, 42c. Capacitors 44a, 44b, 44c, 44d complete the circuit 40.

Since sensors, such as the sensor 26, operate based on a principle of Doppler shift, when slow moving objects are in the field of view, the Doppler frequency is very low, on the order of tens of Hertz. Hence, implementing the circuit 42 with an operational amplifier is a desirable solution.

However, the resistors of the amplifier 40 do, in fact, introduce additional noise into the signals of each of the strings 28-1, 28-2. Surprisingly, the noise introduced by the amplifiers into each of the uncorrelated paths 28-1, 28-2 can be cancelled out by the above-described cross-correlation processing carried out by the DSP 30.

Using a controllable amplifier power supply, such as the supply 34, to reduce power required by the detector 20, the amplifiers, such as the amplifier 40, can be operated in a pulsed mode. In this mode, the amplifiers, such as the amplifier 40, inject additional noise into each of the associated signals, such as S1, S2. The module 26 can also be operated intermittently for similar reasons.

The above described cross-correlation processing can be expected to cancel such amplifier generated noise.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A motion detector comprising:
 a module to detect movement;
 intermediate processing circuitry coupled to an output from the module, wherein the intermediate processing circuitry is activated intermittently to produce a plurality of independent pulsed output signals derived from a first signal received from the output of the module; and
 cross-correlation circuitry coupled to the intermediate processing circuitry to process the plurality of independent pulsed output signals to produce a single motion indicating output signal,
 wherein each of the plurality of independent pulsed output signals is produced concurrently by a respective one of a substantially identical string of components of the intermediate processing circuitry.

2. The motion detector as in claim 1 wherein the respective one of the substantially identical string of components of the intermediate processing circuitry includes a respective amplifier to amplify the first signal.

3. The motion detector as in claim 2 wherein the respective amplifier is an operational amplifier.

4. The motion detector as in claim 1 wherein the cross-correlation circuitry includes a digital signal processor.

5. The motion detector as in claim 1 wherein the intermediate processing circuitry is activated intermittently by control circuits.

6. The motion detector as in claim 5 wherein the control circuits include switchable power supply circuits.

7. The motion detector as in claim 1 further comprising a housing that carries the module, the intermediate processing circuitry, and the cross-correlation circuitry.

8. The motion detector as in claim 7 wherein the intermediate processing circuitry is activated intermittently by control circuits.

9. The motion detector as in claim 8 further comprising transmission circuits coupled to the control circuits to communicate with a displaced location by one of a wired or wireless medium.

10. The motion detector as in claim 9 further comprising a battery coupled to at least the control circuits.

11. A method comprising:
 an intrusion sensor module generating a first signal indicative of motion in a predetermined sensing window;
 an intermediate frequency processing module receiving the first signal;
 substantially identical strings of components of the intermediate frequency processing module concurrently establishing a plurality of independent output signals derived from the first signal;
 cross-correlation circuitry of the intermediate frequency processing module processing each of the plurality of independent output signals to produce a single motion output signal;
 transmitting the single motion output signal to a monitoring system; and
 the monitoring system determining a presence of the motion from a value of the single motion output signal.

12. The method as in claim 11 wherein a respective one of the substantially identical strings of components establishes a respective one of the plurality of independent output signals as a respective digital pulse train.

13. The method as in claim 11 further comprising transmitting the single motion output signal via a wired or wireless medium.

14. A motion detector comprising:
a micro-wave based module to detect movement;
intermediate processing circuitry coupled to an output from the micro-wave based module to produce a plurality of independent output signals derived from a first signal received from the output of the micro-wave based module; and
cross-correlation circuitry coupled to the intermediate processing circuitry to process the plurality of independent output signals to produce a single motion indicating output signal,
wherein each of the plurality of independent output signals is produced concurrently by a respective one of a substantially identical string of components of the intermediate processing circuitry.

15. The motion detector as in claim 14 wherein the respective one of the substantially identical string of components of the intermediate processing circuitry includes a respective amplifier series coupled to a respective analog-to-digital converter.

* * * * *